United States Patent
Bychkov et al.

(10) Patent No.: US 8,078,204 B2
(45) Date of Patent: Dec. 13, 2011

(54) UNSUCCESSFUL CALL ALERT

(75) Inventors: Eyal Bychkov, Hod Hasharon (IL); Uri Ron, Tel Aviv (IL)

(73) Assignee: Google Inc., Mountain View, CA (US)

( * ) Notice: Subject to any disclaimer, the term of this patent is extended or adjusted under 35 U.S.C. 154(b) by 701 days.

(21) Appl. No.: 11/983,444

(22) Filed: Nov. 9, 2007

(65) Prior Publication Data

US 2009/0124269 A1    May 14, 2009

(51) Int. Cl.
*H04W 4/00* (2009.01)

(52) U.S. Cl. ............... 455/466; 455/414.1; 455/413; 455/415; 455/418; 455/412.1

(58) Field of Classification Search ............... 455/412.1, 455/418, 466, 415, 413, 414.1
See application file for complete search history.

(56) References Cited

U.S. PATENT DOCUMENTS

| | | | |
|---|---|---|---|
| 5,628,055 | A | 5/1997 | Stein |
| 5,893,037 | A | 4/1999 | Reele et al. |
| 6,201,867 | B1 | 3/2001 | Koike |
| 6,243,578 | B1 | 6/2001 | Koike |
| 6,529,737 | B1 | 3/2003 | Skinner et al. |
| 6,640,113 | B1 | 10/2003 | Shin et al. |
| 6,680,935 | B1 * | 1/2004 | Kung et al. ............... 370/352 |
| 6,690,947 | B1 | 2/2004 | Tom |
| 6,799,017 | B1 | 9/2004 | Kregel |
| 6,898,283 | B2 | 5/2005 | Wycherley et al. |
| 7,085,542 | B2 | 8/2006 | Dietrich et al. |
| 7,194,285 | B2 | 3/2007 | Tom |
| 2002/0090980 | A1 | 7/2002 | Wilcox et al. |
| 2002/0159572 | A1 | 10/2002 | Fostick |
| 2002/0181672 | A1 | 12/2002 | Cannell et al. |
| 2004/0057561 | A1 | 3/2004 | Gilbert |
| 2004/0209605 | A1 * | 10/2004 | Urban et al. ............... 455/415 |
| 2004/0233930 | A1 | 11/2004 | Colby, Jr. |
| 2004/0267884 | A1 * | 12/2004 | Sar-Shalom ............... 709/206 |
| 2005/0070225 | A1 | 3/2005 | Lee |
| 2005/0159184 | A1 | 7/2005 | Kerner et al. |
| 2006/0105722 | A1 | 5/2006 | Kumar |
| 2006/0140200 | A1 * | 6/2006 | Black et al. ............... 370/401 |
| 2006/0241353 | A1 | 10/2006 | Makino et al. |
| 2006/0246877 | A1 | 11/2006 | Kashanian et al. |
| 2007/0004550 | A1 | 1/2007 | Parikh |
| 2007/0018957 | A1 | 1/2007 | Seo |
| 2007/0161404 | A1 | 7/2007 | Yasujima et al. |
| 2008/0032687 | A1 | 2/2008 | Mathewson et al. |
| 2008/0140886 | A1 | 6/2008 | Izutsu |

FOREIGN PATENT DOCUMENTS

| | | |
|---|---|---|
| EP | 0913982 A2 | 5/1999 |
| EP | 1871075 A1 | 12/2007 |
| GB | 2445669 A1 | 7/2008 |
| WO | 0059247 A1 | 10/2000 |
| WO | 0186922 A1 | 11/2001 |
| WO | 03079657 A1 | 9/2003 |
| WO | 03103174 A1 | 12/2003 |
| WO | 03103262 A1 | 12/2003 |
| WO | 2007127139 A1 | 11/2007 |

* cited by examiner

*Primary Examiner* — Kwasi Karikari
(74) *Attorney, Agent, or Firm* — Soquel Group LLC

(57) ABSTRACT

A method for a mobile phone to provide an unsuccessful call alert, including monitoring an outgoing call from a caller to a callee to determine if the callee is available, if the callee is not available, then automatically activating a message editor, automatically displaying a pre-defined call alert message, including an identifier of the caller and contact information for the caller, enabling the caller to edit the pre-defined call alert message, and sending the call alert message to the callee. A system is also described and claimed.

10 Claims, 6 Drawing Sheets

UNSUCCESSFUL CALL ALERT

FIELD OF THE INVENTION

The field of the present invention is phone call notification.

BACKGROUND OF THE INVENTION

Today's mobile phones have various ways of notifying mobile phone users that someone called them but was unable to reach them. Three such prior art notification methods and their respective drawbacks are described below.

Notification Method:

If a caller, A, calls a callee, B, but is unable to reach B then, in certain circumstances, A may leave a message on B's voice mail service.

Drawbacks:

If B's voice mail is full then A is generally unable to leave a voice message.

Caller A may not wish to leave a voice message.

Notification Method:

If a caller, A, calls a callee, B, and is unable to reach B, then in certain circumstances B's mobile phone will record an identifier of the caller and the date & time of the call in a "Missed Calls" log.

Drawbacks:

The Missed Calls log is only able to log calls that were made to B when B was located within a cell coverage area and B's mobile phone was turned on. Calls made to B when B was located in an area without cell coverage, or when B's mobile phone was turned off, are generally not recorded. If A has a blocked or an unlisted phone number, then A is not identified in B's Missed Calls log, making it impossible for B to return the call. If A has a listed un-blocked phone number, but B does not recognize it, then B may decide to discard the notification and not return the call.

Notification Method:

If a caller, A, calls a callee, B, and is unable to reach B, then in certain circumstances, A's cellular service provider sends an SMS message to B's mobile phone with information about the missed call, including an identifier of the caller, and the date & time of the call.

Drawbacks:

If A has a blocked or an unlisted phone number, then A is not identified in B's Missed Calls log, making it impossible for B to return the call. If A has a listed un-blocked phone number, but B does not recognize it, then B may decide to discard the notification and not return the call.

There is thus a need for alerting a callee, B, that a caller, A, called him but was unable to reach him, in a way that overcomes the above drawbacks, and without sacrificing A's security and B's privacy.

SUMMARY OF THE DESCRIPTION

Aspects of the present invention concern a method and system for unsuccessful call alert, that automatically activates an SMS text message editor, an MMS message editor, an e-mail editor, or a plurality of such editors, when an unsuccessful call is detected. The SMS, MMS, or e-mail editor automatically prepares a message, according to a prescribed message format, and sends the message from a caller, A, to a callee, B. Additionally, A can modify the message prior to its being sent to B.

The present invention overcomes drawbacks of prior art notification methods. By using SMS messages, MMS messages, or e-mail messages (referred to henceforth collectively as "messages"), instead of voice mail, the present invention overcomes failures when B's voice mail is full. Messages may be sent to B when B's mobile phone is busy. In case of emergency, B is able to receive A's message while B is speaking to someone else on his mobile phone, and thus be alerted right away. Messages may be sent to B when B's mobile phone is turned off, and B will receive the messages when he turns his mobile phone on. Moreover, by enabling caller A to edit the message, A may leave his blocked or unlisted phone number for B to return the call or, if A prefers not to disclose his blocked or unlisted number, he may leave an alternate return call phone number or provide other contact information such as an e-mail address.

There is thus provided in accordance with an embodiment of the present invention a method for a mobile phone to provide an unsuccessful call alert, including monitoring an outgoing call from a caller to a callee to determine if the callee is available, if the callee is not available, then automatically activating a message editor, automatically displaying a pre-defined call alert message, including an identifier of the caller and contact information for the caller, enabling the caller to edit the pre-defined call alert message, and sending the call alert message to the callee.

BRIEF DESCRIPTION OF THE DRAWINGS

The present invention will be more fully understood and appreciated from the following detailed description, taken in conjunction with the drawings in which.

DETAILED DESCRIPTION

Aspects of the present invention relate to automatically notifying a mobile phone user that a caller called him but was unable to reach him. When the caller, A, tries to call a callee, B, and is unable to reach him, caller A's mobile phone automatically activates a message editor, such as an SMS message editor, an MMS message editor, or an e-mail message editor, or a plurality of such editors (referred to henceforth collectively as "message editors"), and initializes a pre-designated message to send to B. Caller A may (i) send the pre-designated message as is, (ii) edit the pre-designated message and then send the edited message, or (iii) not send a message. In cases (i) and (ii), the message will be delivered to B in order that B be aware of the call he missed.

Figure 1:
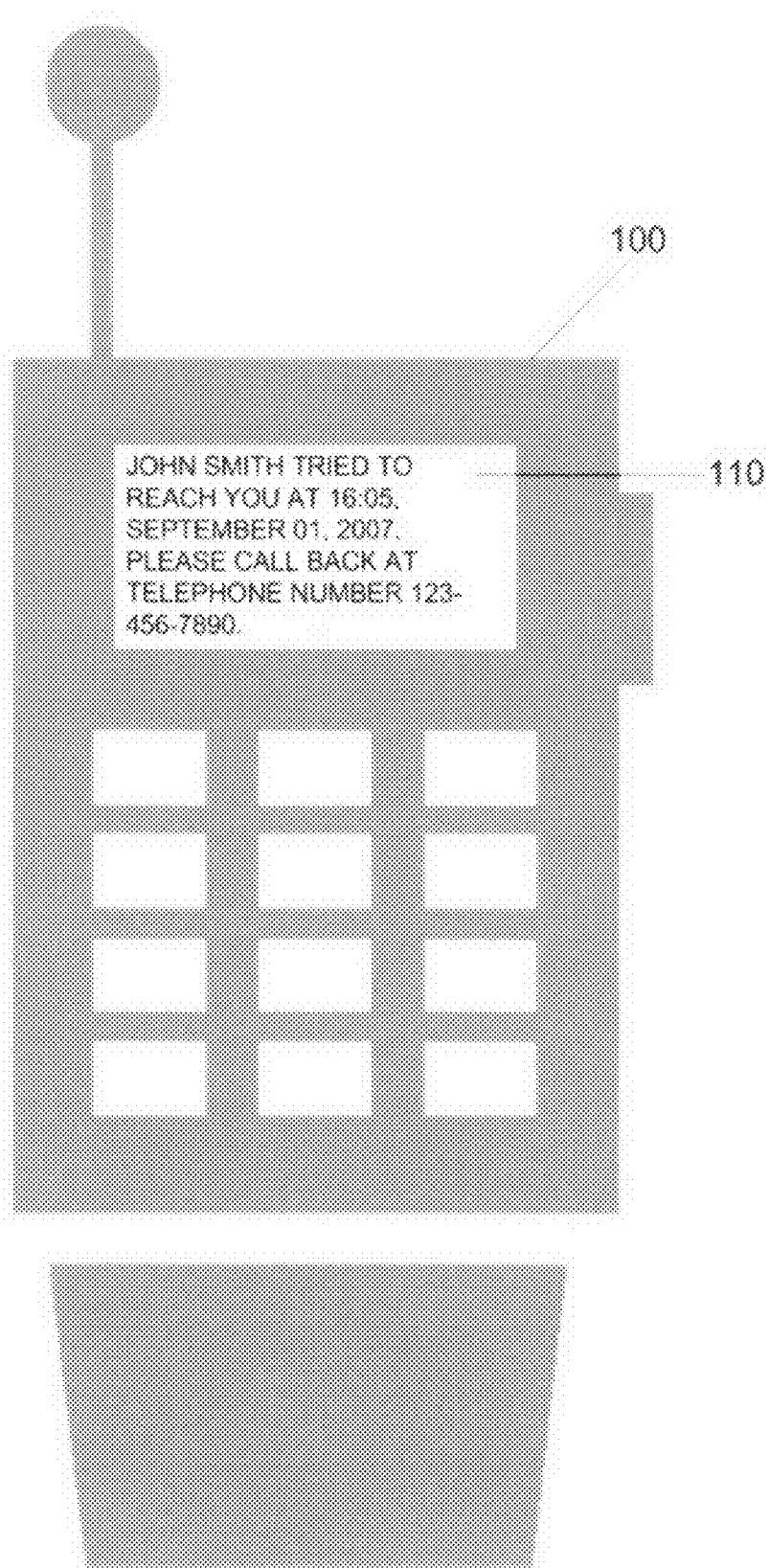
FIG. 1 is an illustration of an unsuccessful call alert, to alert a callee that a caller called him but was unable to reach him, in accordance with an embodiment of the present invention.

Reference is now made to FIG. 1, which is an illustration of an unsuccessful call alert, to alert a callee that a caller called him but was unable to reach him, in accordance with an embodiment of the present invention. Shown in FIG. 1 is the callee's mobile phone 100, displaying an SMS message 110 indicating that the callee missed a call. Message 110 is pre-designated to be of the form "C tried to reach you at T, D. Please call back to telephone number N". The parameters C, T, D and N are respectively, the caller's name, the time, the date and the caller's telephone number. The text strings for these parameters are evaluated in real-time when message 110 is initialized. If the date and time have not been set in the caller's mobile phone (not shown), then message 110 is instead generated in an abridged form "C tried to reach you. Please call back to telephone number N". The caller may edit the abridged message to add the date and time, prior to sending the message.

In one embodiment of the present invention, when caller A's call is not answered by callee B, caller A's mobile phone automatically offers the choice of which type of message to send: an SMS message, an MMS message, or an e-mail message. Based on caller A's choice, the appropriate message editor is automatically activated, and the pre-designated message is initialized.

Figure 2:
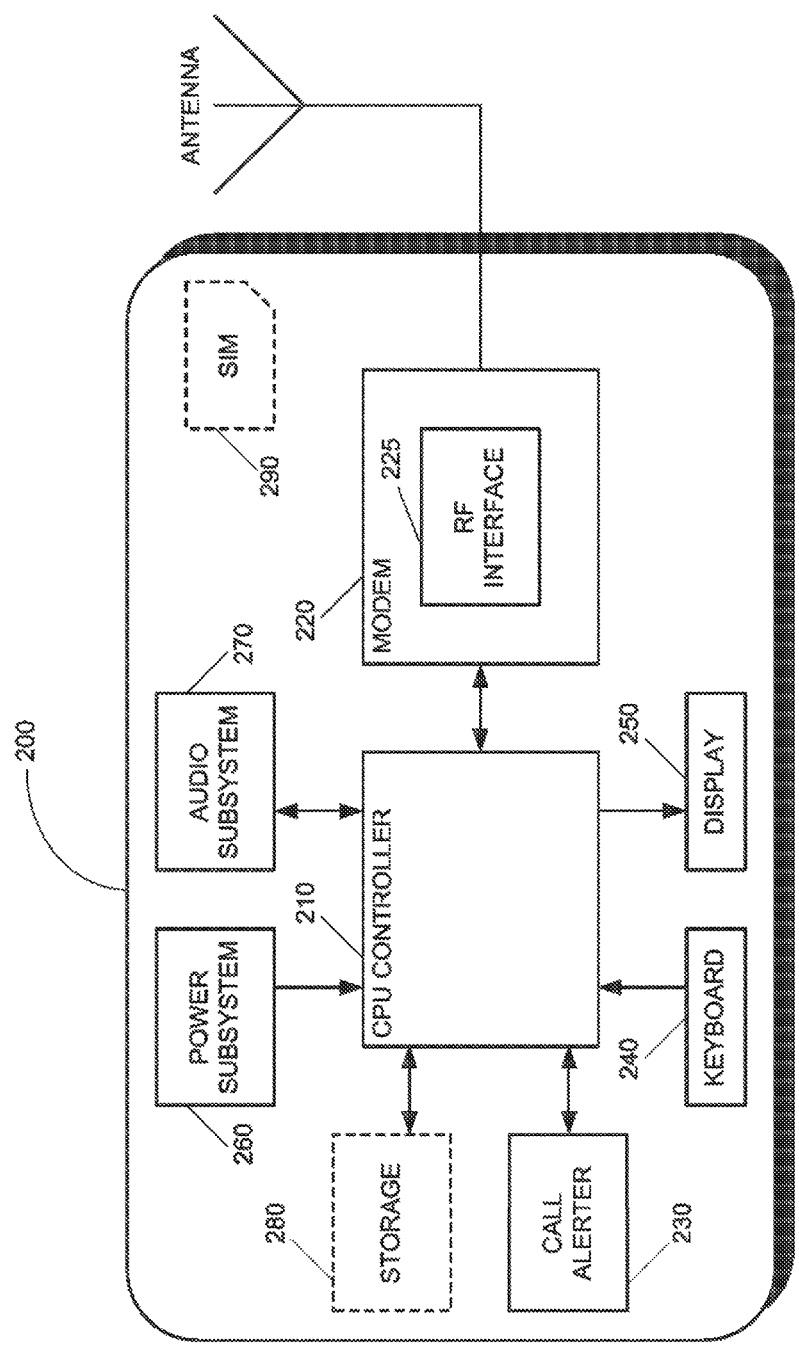
FIG. 2 is a simplified block diagram of an unsuccessful call alert system, for alerting a callee that a caller called him but was unable to reach him, in accordance with an embodiment of the present invention.

Reference is now made to FIG. 2, which is a simplified block diagram of an unsuccessful call alert system 200, for alerting a callee that a caller called him but was unable to reach him, in accordance with an embodiment of the present invention. As shown in FIG. 2, call alert system 200 includes three primary components; namely, a CPU controller 210, a modem 220, and a call alerter 230. Modem 220 includes an RF interface 225 connected to an antenna. Operation of call alerter 230 is described hereinbelow with reference to FIG. 3.

System 200 also includes a keyboard 240 for input, a display 250 for output, a power subsystem 260, and an audio subsystem 270. Optionally, system 200 may also include a storage memory 280 and a SIM card 290.

Figure 3:
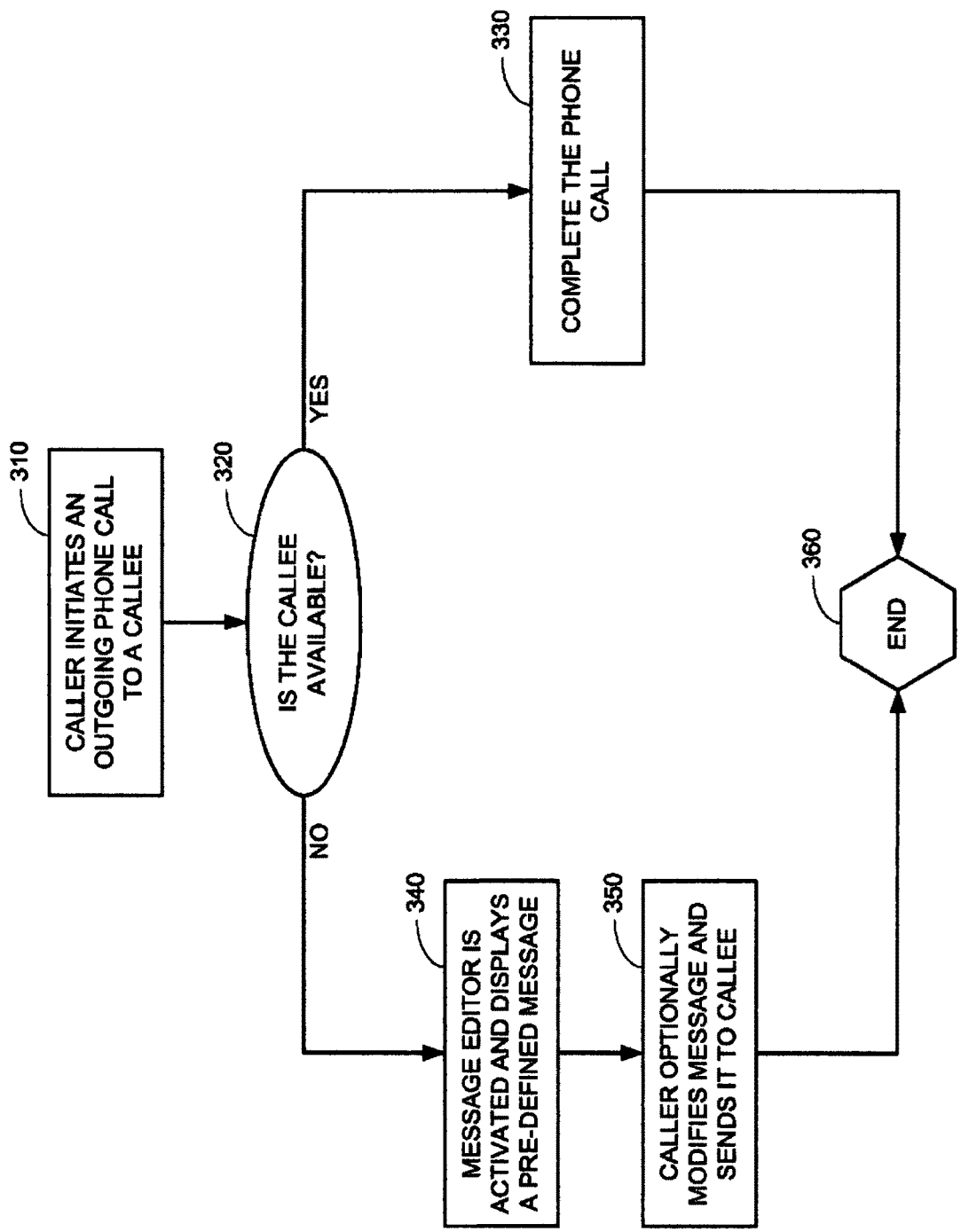
FIG. 3 is a simplified flow chart of a method for alerting a callee that a caller called him but was unable to reach him, in accordance with an embodiment of the present invention.

Reference is now made to FIG. 3, which is a flow chart of a method, performed by call alerter 230 of FIG. 2, for alerting a callee that a caller called him but was unable to reach him, in accordance with an embodiment of the present invention. At step 310, a caller places an outgoing call on his mobile phone to a callee. At step 320, a determination is made whether or not the callee is available. A callee may not be available for a variety of reasons. The callee's phone may be turned off. The callee's phone may be busy. The callee may not wish to answer the call. The callee's phone may forward to a voice mailbox, but the caller does not want to leave a voice message. Generally, the determination at step 320 may be based on call duration; e.g., a duration shorter than 10 seconds may be used as an indicator that the callee is not available.

If it is determined at step 320 that the callee is available, then the call is completed at step 330, and the method ends at step 360. Otherwise, if it is determined at step 320 that the callee is unavailable, then at step 340 a message editor on the caller's mobile phone is activated. The message editor displays a pre-defined message, with text string parameters that are evaluated at run-time. An example of such a pre-defined message is message 110 of FIG. 1.

Activation of the message editor at step 340 may be automatically performed by the caller's mobile phone, or manually performed by the caller. Manual activation may be triggered by the caller pressing an "End" button during the phone call. Alternatively, or additionally, a dedicated button may be used for activating the message editor. Some Nokia cell phones, for example, such as the Nokia 6100 model series, include an "Options" button that a caller may press in order to disconnect a call, or perform other functions with his cell phone. Such an "Options" button may be used for activating the message editor at step 340, in accordance with an embodiment of the present invention.

At step 350 the caller is able to edit the pre-defined message. For example, if the caller's mobile phone number is blocked or unlisted, then the caller may substitute a different phone number for the return call, or may provide other contact information such as an e-mail address. The caller sends the message to the callee, and the method then ends at step 360.

It will thus be appreciated by those skilled in the art that the present invention provides a robust method and system for unsuccessful call alert that overcomes drawbacks of prior art methods and systems. By using messages instead of voice mail, the present invention overcomes failures when B's voice mail is full or when B is outside of a cell coverage area.

Messages may be sent to B when B's mobile phone is busy. In case of emergency, B is able to receive A's message while B is speaking to someone else on his mobile phone. B can then terminate his call, at B's discretion, and contact A immediately.

Messages may be sent to B when B's mobile phone is turned off, and B will receive the messages when he turns his mobile phone on.

By enabling caller A to edit the message, A may leave his blocked or unlisted phone number for B to return the call or, if A prefers not to disclose his blocked or unlisted number, he may leave an alternate return call phone number or provide other contact information such as an e-mail address.

The call alert system of the present invention may be implemented within a variety of wireless communication networks, including inter alia GSM and CDMA. These exemplary networks are respectively illustrated in FIGS. 4 and 5 hereinbelow.

Figure 4:
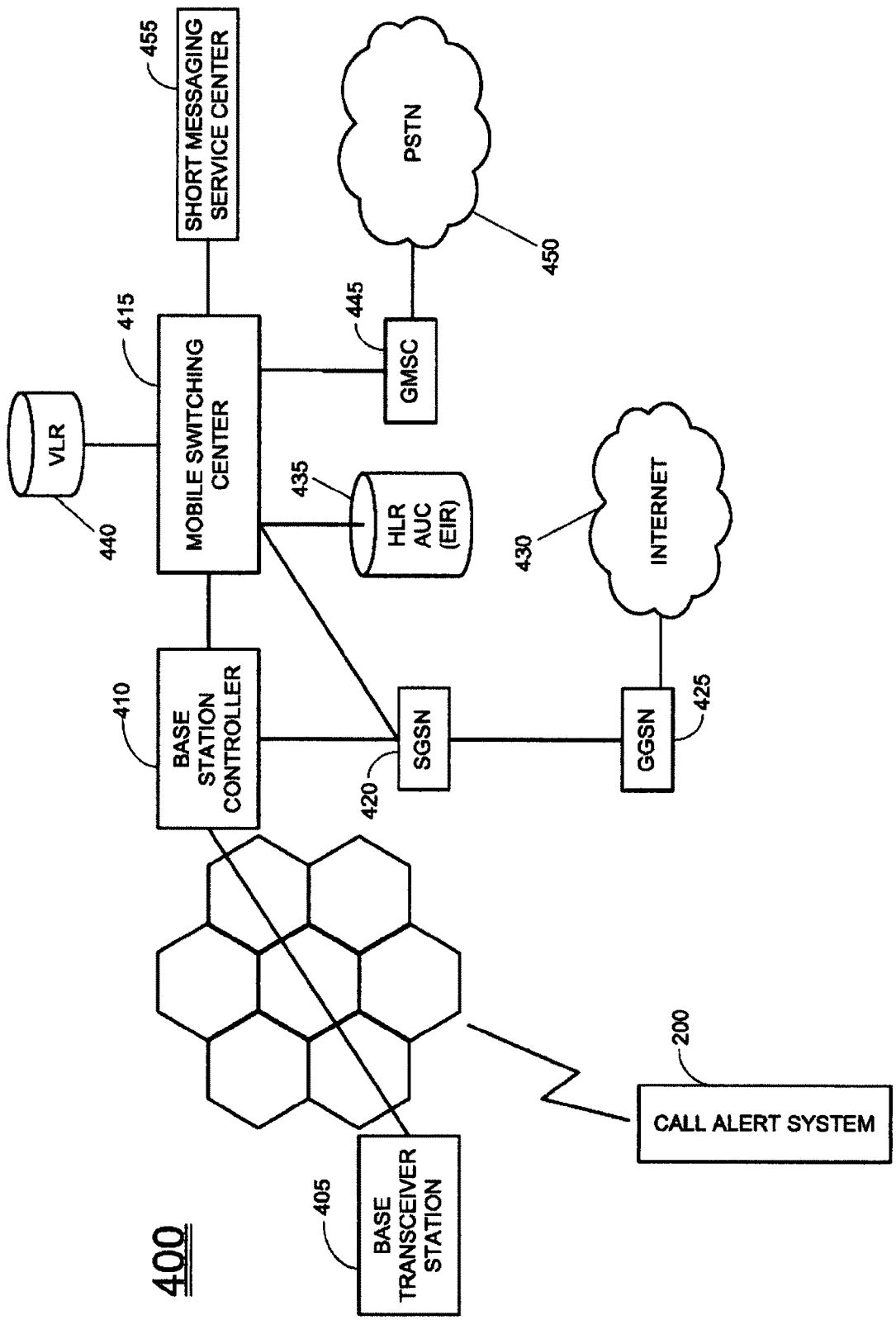
FIG. 4 is a simplified illustration of an exemplary GSM communication network including an unsuccessful call alert system, in accordance with an embodiment of the present invention.

Reference is now made to FIG. 4, which is a simplified illustration of an exemplary GSM communication network 400, within which call alert system 200 is operative, in accordance with an embodiment of the present invention.

Communication network 400 is a General Packet Radio Service (GPRS) network. GPRS is a packet-switched service for the Global System for Mobile Communications (GSM), similar to the Internet. GPRS provides packet radio access for mobile GSM users. GPRS also supports Wireless Application Protocol (WAP) services.

Call alert system 200 communicates with a base transceiver station (BTS) 405 via an over-the-air interface. Base transceiver stations are components of communication network 400 that terminate the over-the-air interface, over which subscriber traffic is communicated to and from call alert system 200. Communication network 400 also includes a base station controller (BSC) 410. Base station controllers are switching modules that provide handoff functions and power level control in base transceiver stations.

BSC 410 is controlled by a mobile switching center (MSC) 415. MSC 415 performs functions of a landline network switching node, including search, signal path switching, and processing of supplementary services. When a request is made for connecting to a subscriber in a landline network, the request is forwarded by MSC 415 to the landline network over a switching path.

BSC 410 controls the interface between MSC 415 and BTS 405, and, as such, controls BTS 405 in call set-up, signaling, and use of radio channels. BSC 410 also controls the interface between a serving GPRS support node (SGSN) 420 and BTS 405. While GSM forms the underlying technology, SGSN 420 is a network element introduced through GPRS technology. Another network element introduced in the GPRS context is the gateway GPRS support node (GGSN) 425, which acts as a gateway to Internet 430.

SGSN 420 services call alert system 200 by sending or receiving packets via a base station subsystem, and more specifically via BSC 410, in the context of GSM systems. SGSN 420 is responsible for delivery of data packets to and from call alert system 200, within a service area. SGSN 420 also performs packet routing and transfer, mobility management, local link management, authentication and charging functions.

In order to accommodate a multitude of services, a provider of communication network 400 stores various types of data. The provider must know which subscribers are using communication network 400, and which services the subscribers use. Subscriber profiles, such as the International Mobile Subscriber Identify Number (IMSI), of GPRS subscribers registered with SGSN 420, are stored in a home location registry (HLR) 435. The owner of call alert system 200 is such a GPRS subscriber.

To determine whether a subscriber is entitled to use communication network 400, the network provider maintains an authentication center (AUC) 435. Generally, AUC 435 includes algorithms and subscriber-related encryption keys, which are used for authentication. AUC 435 determines, inter alia, whether a subscriber has a valid service contract.

The provider of communication network 400 may optionally maintain an equipment identity registry (EIR) 435, which includes details of mobile transceivers permitted on the network. Generally, EIR 435 stores a "white list", a "grey list" and a "black list". The white list includes mobile phones that function reliably, the grey list includes mobile phones that may be defective, and the black list includes mobile phones which are either faulty or have been reported missing or stolen.

In order to establish a connection to a subscriber's mobile phone, the network provider must determine where the subscriber is located and whether his mobile phone is turned on. Such information is stored in a visitor location registry (VLR) 440.

MSC 415 is in communication with a gateway MSC (GMSC) 445, which acts as a gateway to a public-switched telephone network (PSTN) 450.

MSC 415 is also in communication with a short messaging service center (SMSC) 455. A short messaging service center stores and forwards SMS messages to and from mobile stations via MSC 415. When SMSC 455 receives a short message for transmission to a mobile station, SMSC 455 interrogates the current position of the mobile station from HLR 435.

Figure 5:
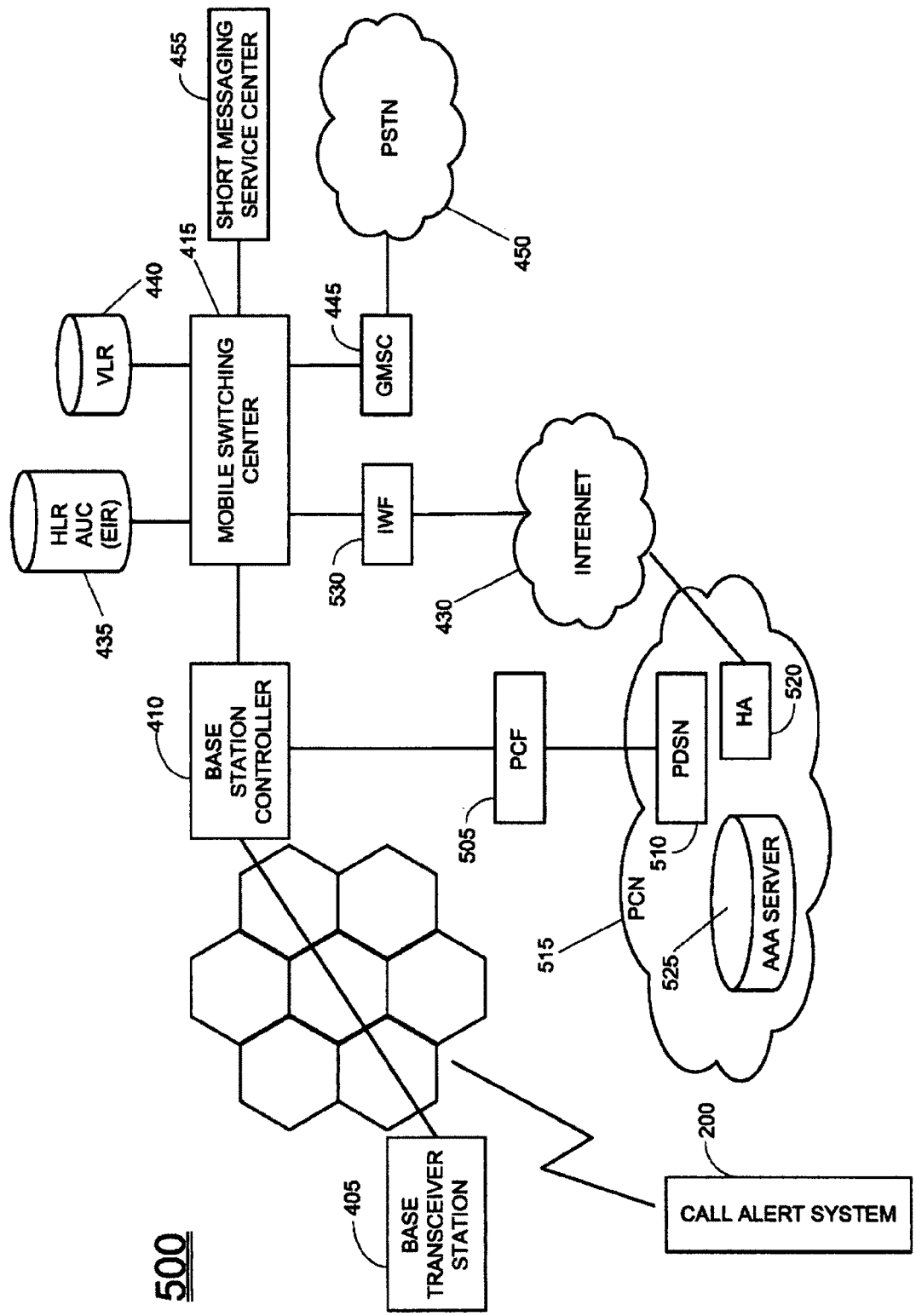
FIG. 5 is a simplified illustration of an exemplary CDMA communication network including an unsuccessful call alert system, in accordance with an embodiment of the present invention.

Reference is now made to FIG. 5, which is a simplified illustration of an exemplary Code Division Multiple Access (CDMA) communication network 500, within which call alert system 200 transmits unsuccessful call alerts, in accordance with an embodiment of the present invention. The specific communication network shown in FIG. 5 conforms to the CDMA2000 1X standard. Communication network 500 includes several components of FIG. 4; namely, call alert system 200, base station transceiver 405, base station controller 410, mobile switching center 415, Internet 430, HLR/AUC/EIR 435, VLR 440, GMSC 445, PSTN 450 and SMSC 455.

In communication network 500, BSC 410 is in communication with a packet control function (PCF) 505. In turn, PCF 505 is in communication with a packet data serving node (PDSN) 510, which is part of a packet core network (PCN) 515. A packet core network generally includes a succession of interconnected routers, or such other communication nodes, that carry Internet protocol (IP) data traffic.

PDSN 510 provides both mobility management functions, similar to SGSN 420, and packet routing functions, similar to GGSN 450. PDSN 510 serves as a connection point between a radio access network and an IP network, and manages point-to-point sessions between a mobile phone and an IP address.

PCF 505 provides a relay from PDSN 510 to a mobile phone. PCF 505 tracks registration expiration, and ensures that sessions are renewed as necessary. PCF 505 also controls available radio resources, and buffers data received from PDSN 510 when radio resources are not available. PCF 505 also controls dormancy.

PCN 515 also includes a home agent (HA) 520. Generally, HA 520 manages roaming and handoff of mobile data. HA 520 is used for registration of a mobile IP (MIP), and transfer of mobile packet data in PDSN 510. Through tunneling, HA 520 transfers MIP data from a home network to PDSN 510, and from PDSN 510 to the home network through a reverse tunnel.

PCN 515 also includes an authentication, authorization and accounting (AAA) server 525. Generally, AAA server 525 is responsible for access control. AAA server 525 processes user requests for access to computer resources and, for enterprises, provides authentication, authorization and accounting services. Authentication is used to identify subscribers. Authorization is used to manage policies and service profiles that govern which resources and services a subscriber may access, and to manage and distribute security keys. Accounting services track usage of time and data resources, and manage billing. AAA server 525 interacts with network access and gateway servers, and with databases and directories containing user information.

In communication network 500, MSC 415 is in communication with an interworking function (IWF) 530. An interworking function provides an interface between wireless data networks and data packet networks such as Internet 430 or corporate intranets, and also between wireless data networks and wireline networks such as PSTN 450. The interworking function converts and sends data to a data packet network or a wireline network, based on the data type. Generally, IWF 530 includes modems or data terminal adapters, or both, to convert data transmitted over a wireless network to a format suitable for recognition and carrying by a public telecommunications network.

Figure 6:
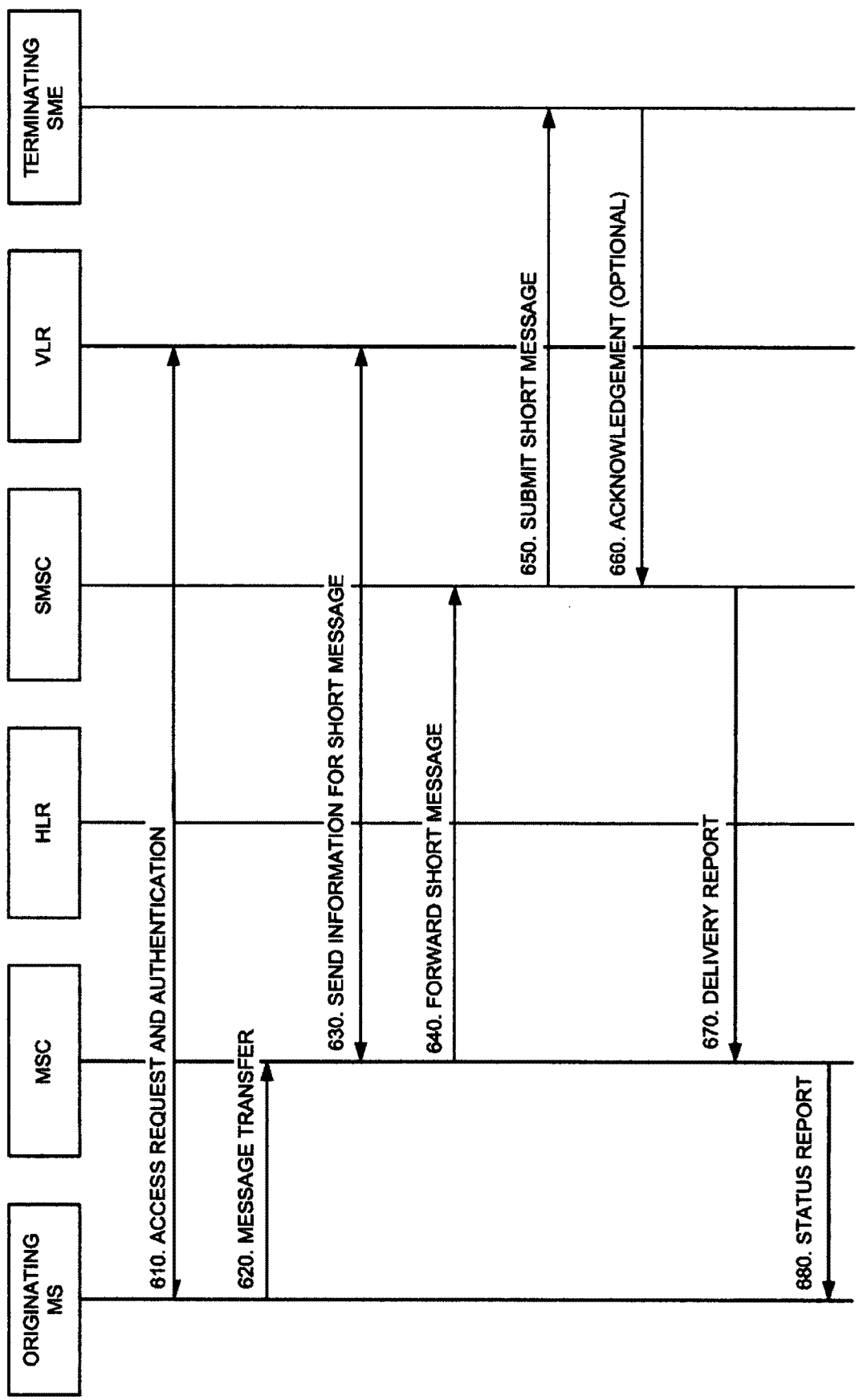
FIG. 6 is a simplified flowchart of how a mobile-originated short message with an unsuccessful call alert is transferred over a GSM network, in accordance with an embodiment of the present invention.

Reference is now made to FIG. 6, which is a simplified flowchart of how a mobile-originated short message with an unsuccessful call alert is transferred over a GSM network, such as network 400, in accordance with an embodiment of the present invention. At step 610 call alert system 200 is powered on and its messaging service, referred to as the "originating messaging service (MS)", is registered with network 400. Access request and authentication are exchanged between the originating messaging service and a visitor location registry (VLR), such as VLR 440.

At step 620 the originating messaging service transfers a call alert short message, in accordance with the present invention, to a mobile switching center (MSC), such as MSC 415. At step 630 the MSC interrogates the VLR to verify that short message transfer does not violate restrictions of revoked services of the owner of call alert system 200.

If verification is confirmed, then at step 640 the MSC sends the short message to a short messaging service center (SMSC), using a forwardShortMessage ( ) operation. At step 650 the SMSC delivers the short message to its destination, referred to as the "terminating short message entity (SME)".

At step 660, the terminating SME sends an acknowledgement to the SMSC. Step 660 is optional.

At step 670 the SMSC sends the MSC an acknowledgement with the successful or unsuccessful outcome of the forwardShortMessage( ) operation. Finally, at step 680 the MSC returns to the originating MS an acknowledgement of whether or not the mobile originated short message was successfully delivered.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A method for a mobile phone to provide an unsuccessful call alert, comprising:
    monitoring, by a caller's mobile phone, an outgoing call from a caller having a blocked or unlisted phone number, to a callee to determine if the callee is available;
    if the callee is not available, then:
        automatically presenting, by the caller's mobile phone, the caller with choices of (1) sending an SMS message, (2) sending a MMS message, (3) sending an e-mail message, or (4) not sending a message;
        automatically activating, by the caller's mobile phone, an SMS message editor, an MMS message editor, or an e-mail message editor in response to the respective choice by the caller of (1), (2) or (3);
        automatically generating, by the activated message editor, an editable pre-defined call alert text message, comprising generating a text identifier of the caller and generating text contact information for the caller, the text contact information comprising the caller's blocked or unlisted phone number;
        editing, by the activated message editor, the pre-defined call alert text message, thereby replacing the text contact information for the caller with substitute text contact information, so as to avoid disclosing the caller's blocked or unlisted phone number; and
        sending, by the caller's mobile phone, the call alert text message, as edited, to the callee.

2. The method of claim 1 wherein said automatically generating also comprises generating a date & time in the pre-defined alert message.

3. The method of claim 1 wherein the substitute text contact information comprises a phone number for returning the call.

4. The method of claim 1 wherein the substitute text contact information comprises an e-mail address for the caller.

5. The method of claim 1 wherein said monitoring determines if the callee is available based on a duration of the call.

6. A call alert system for a caller's mobile phone, comprising:
    a modem (i) for enabling a caller having a blocked or unlisted phone number, to place an outgoing call to a callee via wireless transmission, and (ii) for sending an edited call alert text message to the callee;
    a message editor comprising an SMS message editor, an MMS message editor, and an email message editor (iii) for generating an editable pre-defined call alert text message, the call alert text message comprising a text identifier of the caller and text contact information for the caller, the text contact information comprising the caller's blocked or unlisted phone number, and (iv) for editing the pre-defined call alert text message, thereby replacing the text contact information for the caller with substitute text contact information, so as to avoid disclosing the caller's blocked or unlisted phone number;
    a call alerter (v) for monitoring the outgoing call from the caller to the callee to determine if the callee is available, and, if the callee is not available, (vi) for presenting the caller with choices of (1) sending an SMS message, (2) sending a MMS message, (3) sending an e-mail message, or (4) not sending a message, and (vii) for activating the SMS message editor, the MMS message editor, or the e-mail message editor in response to the respective choice by the caller of (1), (2) or (3).

7. The call alert system of claim 6 wherein the pre-defined call alert text message generated by said text editor also comprises a date & time.

8. The call alert system of claim 6 wherein the substitute text contact information comprises a phone number for returning the call.

9. The call alert system of claim 6 wherein the substitute text contact information comprises an e-mail address for the caller.

10. The call alert system of claim 6 wherein said call alerter determines if the callee is available based on a duration of the call.

* * * * *